3,590,011
METHOD FOR THE PRODUCTION OF AN
ANION-EXCHANGE RESIN
Lev Leonidovich Grachev, Ul. Karla Marka 93, kv. 23;
Igor Vasilievich Samborsky, Ul. Krasnoflotskaya 17, kv.
3; and Alexei Feodosievich Chetverikov, Ul. Gazetnaya
70, kv. 30, all of Sverdlovskaya, Oblast Nizhny Tagil,
U.S.S.R.
No Drawing. Filed Oct. 16, 1968, Ser. No. 768,198
Int. Cl. C08g 33/06, 23/12
U.S. Cl. 260—2.1
16 Claims

ABSTRACT OF THE DISCLOSURE

Production of a wide variety of anion exchange resins which have good chemical resistance and thermal stability, high exchange rate and which are insignificantly poisoned with organic materials by condensing epichlorohydrin and ammonia in a molar ratio of from 1:0.25 to 1:0.5 to produce a water soluble oligomer containing chloromethyl groups, adjusting the hydrogen ion concentration of the reaction medium to $\geq 7$ with a compound which may be inorganic, aliphatic organic or aromatic organic, taken in an amount of 2 to 0.25 equivalents per mole of the epichlorohydrin feed, preparing a gel, and aging the gel. The characteristics of exchange resin vary depending on the material used to adjust the hydrogen ion concentration.

---

This invention relates to methods for producing epoxy-polyamine basic anion-exchange resins which are widely used in ion-exchange processes, e.g. for water treatment, in hydrometallurgy and also in the food industry and other industrial fields.

It is known to produce anion-exchange resins of this type by condensing epichlorohydrin and aqueous ammonia taken in a molar ratio of from 1:1 to 1:4, followed by hardening the resultant water-soluble oligomer with glycerol halohydrins or 1.2-epoxy-3-halohydrin. In some cases, oligomer setting is expedited by the addition of heterocyclic amines.

The known method is incapable of producing a wide range of anion exchangers having different unit cell dimensions and further suffers in that it cannot produce anion-exchange resins exhibiting an exchange capacity in excess of 10.5 mg.-equiv. per gram.

The known anion-exchange resins, both weakly and strongly basic, are unsuitable, for the most part, for use at temperatures close to 100° C. and at pH$\geq$7.

All available anion-exchange resins are susceptible to a greater or lesser extent to poisoning with organic materials dissolved in natural water, poisoning being due to the irreversible absorption of the aforesaid organic materials by the resin resulting in a marked decrease of the service life of such anion-exchange resins.

It is an object of the present invention to provide anion-exchange resins noted for their good chemical resistance and thermal stability, which exhibit a high exchange rate and which are insignificantly susceptible to poisoning with organic materials dissolved in natural water.

It is a further object of the present invention to provide methods for the production of anion-exchange resins which make it possible to obtain a wide range of anion-exchange resins that exhibit different exchange capacities and are suitable for use in diverse industrial fields.

These and other objects are accomplished by the provision of an anion-exchange resin prepared by condensing epichlorohydrin and ammonia, followed by treating the resultant water-soluble oligomer so as to obtain an insoluble gel, wherein, according to the invention, epichlorohydrin and ammonia are taken in a molar ratio of from 1:0.25 to 1:0.5 and the condensation yields a water-soluble oligomer of the following general formula

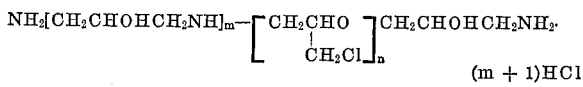

$$(m + 1)HCl$$

wherein $m$ and $n$ are integers.

The thus-obtained oligomer containing chloromethyl groups is treated with compounds which adjust the hydrogen ion concentration of the reaction medium to a pH$\geq$7, taken in an amount of 2 to 0.25 equivalents per mole of the epichlorohydrin feed and the liquid reaction mass is converted into an insoluble gel. The gel is thereafter allowed to age.

To prepare an oligomer having the aforementioned structure, it is expedient to gradually and continuously run an aqueous solution of ammonia into vigorously stirred epichlorohydrin preheated to a temperature of 70° C., the temperature being maintained until there is obtained the desired water-soluble oligomer.

The oligomer is then treated with any of a variety of materials capable of adjusting the hydrogen ion concentration of the medium to a pH$\geq$7. Ammonia, alkaline metal hydroxides, and the alkaline metal salts of weak acids are exemplary inorganic compounds suitable for adjusting the pH. It is likewise practicable to adjust the pH by using organic amines, both aliphatic amines such as diaminoisopropanol or amines of the general formula $NH_2(CH_2)_nNH_2$, wherein $n$ is an integer of 2 to 10, or of the general formula $NH_2(C_2H_4NH)_nC_2H_4NH_2$, wherein $n$ is an integer of 1 to 200, and aromatic amines of the phenylene diamine type.

The basic inorganic compound or amine used governs the type of anion-exchange resin which is produced.

For example, where it is desired to prepare a weakly basic anion-exchange resin having small unit cells and noted for its enhanced exchange capacity ($>$7 mg.-equiv. per gram), the oligomer should be treated with aqueous ammonia to adjust the reaction medium to pH$\geq$7.

An anion-exchange resin having a small unit cell and exhibiting a low exchange capacity ($<$6 mg.-equiv. per gram) is obtained by mixing the oligomer with aqueous alkalies or an aqueous solution of the alkaline metal salts of weak acids, the preferred compounds for adjusting the reaction medium to pH$>$7 being aqueous sodium hydroxide or sodium carbonate.

Anion exchange-resins prepared by treating the oligomer with amines of the general formula

wherein $n$ or the degree of polymerization varies from 1 to 200, are noted for their exceptionally high exchange capacity ($>$10.5 mg.-equiv. per gram) and excellent thermal stability under neutral or basic conditions (thermal stability factor, 0.99 or better).

Anion-exchange resin exhibiting selectivity towards trace elements, preferably to germanium in acidic medium, are produced by treating the oligomer with diaminoisopropanol.

The anion exchangers which result from treating the oligomer with phenylene diamines, preferably with o-phenylene diamine or p-phenylene diamine, also exhibit, apart from ion exchange properties, reversible redox characteristics.

In order to obtain an anion-exchange resin in the form of spherical granules, gelation should be effected by the pearl polycondensation technique in an inert medium that is immiscible with the oligomer and consists, for the most part, of aromatic or aliphatic hydrocarbons in the presence or absence of suspension stabilizers.

To prepare the gel, recourse may also be had to block polymerization, which technique involves maintaining the fluid solution at a temperature of 70–85° C. The resultant anion-exchange resin yields, upon comminution, irregular grains.

Where it is desired to obtain an anion exchanger in the form of a dry material which lends itself readily to transportation and processing, particularly in winter time, gel ageing should preferably be carried out by subjecting the gel to heat treatment at a temperature of 100–140° C. for a period of 5–12 hours.

Enhanced cracking and impact resistance may be imparted to the anion-exchange resins by preferably carrying out ageing in a 2–15% caustic solution at a temperature of 80–55° C.

EXAMPLE 1

(a) Oligomer preparation.—Into a 1-l. three-necked flask fitted with a stirrer, a reflux condenser, a thermometer and a dropping funnel, is placed 185 grams (2 moles) of epichlorohydrin and the contents of the flask are heated to a temperature of 62–65° C., followed by running thereinto in a continuous thin stream 136 grams (1 mole) of 12.5% aqueous ammonia. The aqueous ammonia should be introduced at a rate sufficient to maintain the reaction mixture at a temperature of 62–65° C. due to the heat evolved in the course of the exothermic process. When all the aqueous ammonia has been added, the reaction mixture is allowed to stand at a temperature of 60–70° C. until there forms a clear, water-soluble oligomer having the following properties:

| | |
|---|---|
| pH | 5.6 to 5.8. |
| $d_4^{20}$ | 1.231 to 1.238. |
| $n_D^{20}$ | 1.457 to 1.460. |
| Dry matter content | 63.4±0.2%. |
| Content of chlorides | 8 to 9%. |
| Total chlorine content | 35.0±0.2%. |
| Total nitrogen content | 6.9±0.2%. |
| Content of primary amino groups | 2 to 3%. |
| Average molecular weight | 550 to 800. |
| Intrinsic viscosity $[\eta]$ | ≈0.0175. |

(b) Oligomer processing.—The oligomer (160.5 grams) is mixed a room temperature with 88.5 grams of 12.5% aqueous ammonia (0.75 mole) to obtain a homogeneous solution.

(c) Gel preparation.—The homogeneous solution of the oligomer in aqueous ammonia is transferred to a porcelain dish and placed in a drying cabinet maintained at 85° C. Within 20–30 minutes, there forms a transparent, brittle gel.

(d) Gel ageing.—The resultant gel is crushed to obtain pieces ca. 1 cm. in dia. and thereafter heated in a drying cabinet at a temperature of 110–120° C. for a period of 12 hours.

The anion-exchange resin thus prepared is comminuted as required, screened into fractions, allowed to swell in a concentrated aqueous solution of sodium chloride, and thereafter subjected to conventional treatment with an aqueous solution of sodium hydroxide.

The anion-exchange resin has a total exchange capacity of 2.1 mg.-equiv./ml. and 7.4 mg.-equiv./g. (chloride-ion removal), the chemical resistance in water, expressed here and in subsequent examples in mg. $O_2$ per gram dry resin, being 0.0 mg. $O_2$/g.

EXAMPLE 2

(a) Oligomer preparation.—As disclosed in Example 1.

(b) Oligomer processing.—160.5 grams of the oligomer are mixed with 440 grams (1.1 moles) of 10% aqueous solution of sodium hydroxide until there forms a homogeneous solution.

(c) Gel preparation.—As disclosed in Example 1.

(d) Gel ageing.—As disclosed in Example 1.

The anion-exchange resin has a total exchange capacity of 1.5 mg.-equiv./ml. and 5.6 mg.-equiv./g. (chloride-ion removal) the chemical resistance in water being 3.1 mg. $O_2$/g.

EXAMPLE 3

(a) Oligomer preparation.—As disclosed in Example 1.

(b) Oligomer processing.—The oligomer (160.5 grams) is mixed with 583 grams (1.1 moles) of a 20% aqueous solution of sodium carbonate until there forms a homogeneous solution.

(c) Gel preparation.—The solution so prepared is allowed to stand for 24 hours at room temperature and the resultant brittle gel is crushed so as to obtain 1-cm. pieces.

(d) Gel ageing.—As disclosed in Example 1.

The anion-exchange resin has a total exchange capacity of 1.2 mg.-equiv./ml. and 5.6 mg-equiv./g. (chloride-ion removal), the chemical resistance in water being 0.9 mg. $O_2$/g.

EXAMPLE 4

(a) Oligomer preparation.—As disclosed in Example 1.

(b) Oligomer processing.—The oligomer (160.5 grams) is mixed with 120 grams (0.5 mole) of a 25% aqueous solution of ethylene-diamine to obtain a homogeneous solution.

(c) Gel preparation.—The solution so prepared is allowed to stand for 24 hours at room temperature and the resultant brittle gel is crushed so as to obtain 1-cm. pieces.

(d) Gel ageing.—As disclosed in Example 1.

The anion-exchange resin has a total exchange capacity of 2.9 mg.-equiv./ml. and 9.5 mg.-equiv./g., the chemical resistance in water being 0.6 mg. $O_2$/g. and the OH—Cl exchange rate constant, $1.2 \times 10^{-2}$ min.$^{-1}$.

EXAMPLE 5

(a) Oligomer preparation.—As disclosed in Example 1.

(b) Oligomer processing.—The oligomer (160.5 grams) is mixed with 43.5 grams of hexamethylene diamine dissolved in 43.5 grams of ethanol until there forms a homogeneous solution.

(c) Gel preparation.—As disclosed in Example 1.

(d) Gel ageing.—As disclosed in Example 1.

The anion-exchange resin has a total exchange capacity of 2.9 mg.-equiv./ml. and 10.7 mg.-equiv./g. (chloride-ion removal), the chemical resistance in water being 1.7 mg. $O_2$/g., and the OH–Cl exchange rate constant, $3.3 \times 10^{-2}$ min.$^{-1}$.

EXAMPLE 6

(a) Oligomer preparation.—As disclosed in Example 1.

(b) Oligomer processing.—The oligomer (160.5 grams) is mixed with 65 grams of polyethylenepolyamine (polymerization degree, 5 to 7) dissolved in water until there forms a homogeneous solution.

(c) Gel preparation.—As disclosed in Example 1.

(d) Gel ageing.—As disclosed in Example 1.

The characteristics of the anion-exchange resin are as follows:

Total exchange capacity (chloride-ion removal)—3.5 mg.-equiv./ml. and 12.1 mg.-equiv./g.;
Chemical resistance in water—0.1 mg. $O_2$/g.;
OH-Cl exchange rate constant—$4.8 \times 10^{-2}$ min.$^{-1}$;
Thermal stability factor at 100° C.—0.99;
Loss of pilot filter capacity after service life of $1.75 \times 10^4$ hours—8.5%.

EXAMPLE 7

(a) Oligomer preparation.—As disclosed in Example 1.

(b) Oligomer processing. — The oligomer (160.5 grams) is mixed with 65 grams of polyethylenepolyamine (polymerization degree, 200) dissolved in water until there forms a homogeneous solution.

(c) Gel preparation.—As disclosed in Example 1.

(d) Gel ageing.—As disclosed in Example 1.

The characteristics of the anion-exchange resin are as follows:

Total exchange capacity (chloride-ion removal)—3.0 mg.-equiv./ml., 8.5 mg.-equiv./g.;
Chemical resistance in water—0.0 mg. $O_2$/g.;
OH-Cl exchange rate constant—$3.8 \times 10^{-2}$ min.$^{-1}$;
Thermal stability factor at 100° C.—0.98.

EXAMPLE 8

(a) Oligomer preparation.—As disclosed in Example 1.
(b) Oligomer processing. — The oligomer (160.5 grams) is mixed at room temperature with 33.75 grams of diaminoisopropanol dissolved in 40 ml. of water until there is formed a homogeneous solution.
(c) Gel preparation.—As disclosed in Example 1.
(d) Gel ageing.—As disclosed in Example 1.

The characteristics of the anion-exchange resin are as follows:

Total exchange capacity (chloride-ion removal)—3.1 mg.-equiv./ml., 9.5 mg.-equiv./g.;
Chemical resistant in water—0.5 mg. $O_2$/g.;
Thermal stability factor at 100° C.—0.99;
Exchange capacity for arsenic in 5 N HCl—0.0 mg./g.;
Exchange capacity for iron in 5 N HCl—0.1 mg./g.;
Exchange capacity for zinc in 5 N HCl—0.2 mg./g.;
Exchange capacity for germanium in 5 N HCl—Up to 16 mg./g.

EXAMPLE 9

(a) Oligomer preparation.—As disclosed in Example 1.
(b) Oligomer processing. — The oligomer (160.5 grams) is mixed with 40.5 grams of a saturated solution of p-phenylene diamine in ethanol until there is obtained a homogeneous solution.
(c) Gel preparation.—The homogeneous mixture of the oligomer and p-phenylene diamine is transferred to a porcelain dish and placed in a drying cabinet maintained at a temperature of 75-80° C. The oxidation of the p-phenylene diamine with atmospheric oxygen is prevented by purging the drying cabinet with nitrogen or some other inert gas. The mixture is kept in the drying cabinet until it turns into a brittle gel which is thereafter crushed to obtain 1-cm. pieces.
(d) Gel ageing.—The resultant crushed gel is heated in a drying cabinet at a temperature of 110-120° C. in an inert gas atmosphere for a period of 12 hours.

The anion-exchange resin thus prepared is comminuted as required, screened into fractions, allowed to swell in a concentrated solution of sodium chloride, and thereafter treated with a 1% solution of hydrosulfite in 2% sodium hydroxide. Then the anion-exchange resin is washed with oxygen-free water to remove excess alkali and reducing agent.

The characteristics of the anion-exchange resin are as follows:

Total exchange capacity (chloride-ion removal)—2.2 mg.-equiv./ml., 4.7 mg.-equiv./g.;
Chemical resistance in water—2.1 mg. $O_2$/g.;
Redox capacity—2.3 mg.-equiv./g.

EXAMPLE 10

(a) Oligomer preparation.—As disclosed in Example 1.
(b) Oligomer processing.—As disclosed in Example 6.
(c) Gel preparation.—The homogeneous mixture of the oligomer and polyethylenepolyamine is rapidly transferred to a flask containing 870 ml. of transformer oil heated to 80° C., the contents of the flask are stirred vigorously for 1 hour, while maintaining the temperature at 80-90° C., and thereafter spherical granules of the gel thus prepared are separated from the transformer oil by filtration.
(d) Gel ageing.—The gel granules so prepared are placed in a drying cabinet and heated at a temperature of 110-120° C. for 12-15 hours.

The finished gel granules are then immersed in a concentrated solution of sodium chloride and allowed to swell, followed by washing the swollen granules repeatedly in a vigorously stirred 0.025% solution of surfactant to remove the last traces of transformer oil.

Next the washed granules are subjected to conventional treatment with aqueous sodium hydroxide.

The characteristics of the anion-exchange resin are as follows:

Total exchange capacity (chloride-ion removal)—4.1 mg.-equiv./ml., 11.6 mg.-equiv./g.;
Chemical resistance in water—0.1 mg. $O_2$/g.;
OH-Cl exchange rate constant—$3.8 \times 10^{-2}$ min.$^{-1}$;
Thermal stability factor at 100° C.—0.99;
Loss of pilot filter capacity after service life of $1.75 \times 10^4$ hours—6.7%;
Oil content in granules—2–3 mg./g.

EXAMPLE 11

(a) Oligomer preparation.—As disclosed in Example 1.
(b) Oligomer processing.—As disclosed in Example 6.
(c) Gel preparation.—As disclosed in Example 10.
(d) Gel ageing.—Upon transformer oil removal, the gel granules are transferred to a flask fitted with a stirrer and containing 1,200 ml. of 10% sodium hydroxide solution and 0.025% of a surfactant added thereto. The contents of the flask are heated, with continual stirring, at a temperature of 80-90° C. for a period of one hour.

The aged gel is washed again with a 0.025% solution of surfactant and thereafter washed free from alkali excess with demineralized water.

The characteristics of the resultant anion-exchange resin are as follows:

Total exchange capacity (chloride-ion removal)—4.1 mg.-equiv./ml., 11.9 mg.-equiv./g.;
Chemical resistance in water—0.0 mg. $O_2$/g.;
OH-Cl exchange rate constant—$4.3 \times 10^{-2}$ min.$^{-1}$;
Thermal stability factor at 100° C.—0.99;
Loss of pilot filter capacity after service life of $1.75 \times 10^4$ hours—2.5%;
Oil content in granules—1 mg./g. maximum.

By way of comparison, presented hereinbelow are the characteristics of anion-exchange resin prepared by the known method:

Total exchange capacity (chloride-ion removal)—2.2 mg.-equiv./ml., 9.1 mg.-equiv./g.;
Chemical resistance in water—6.2 mg. $O_2$/g.;
OH-Cl exchange rate constant—$1.9 \times 10^{-2}$ min.;
Thermal stability factor at 100° C.—0.70;
Loss of pilot filter capacity after service life of $1.75 \times 10^4$ hours—37%.

It follows from the data presented hereinabove that the present method is instrumental in providing a wide range of high-quality weakly basic anion exchangers noted for their high chemical resistance and thermal stability, as well as exhibiting high exchange rates, the anion-exchange resins, according to the present invention, being useful for diverse applications.

Relevant investigations have shown the process of oligomer formation to proceed, presumably, according to the following scheme:

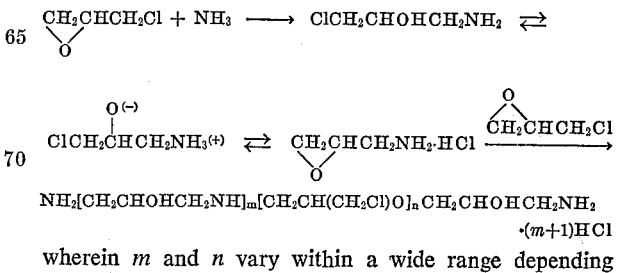

wherein $m$ and $n$ vary within a wide range depending upon the proportion of the components used and the molecular weight of the desired oligomer. However, usually $m=1-3$ and $n=4-7$. Formation of the oligomer containing chloromethyl groups occurs due to the fact that epichlorohydrin is subjected to condensation with small quantities of ammonia.

The presence of active chloromethyl groups in the oligomer is conducive to the employment of diverse amines with a view to effecting cross-linking and to varying within a wide range the properties of the resultant anion exchangers.

On the contrary, the known method for the production of anion-exchange resins contemplates synthesizing the oligomer, according to the following overall equation.

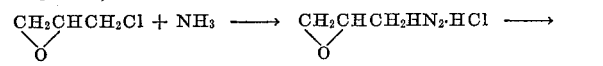

$NH_2(CH_2CHOHCH_2NH)_nCH_2CHOHCH_2 \cdot (n + 1)HCl$ so that the resultant oligomer contains no free chloromethyl groups due to the introduction of excess ammonia into the reaction, thereby excluding the possibility of producing a wide range of anion exchangers which are similar as to type, but differ as to the degree of cross-linking.

We claim:

1. A method for the production of an anion-exchange resin which comprises carrying out consecutively the following process steps: condensing epichlorohydrin and ammonia in a molar ratio of from 1:0.25 to 1:0.5 to obtain a water-soluble oligomer having the general formula

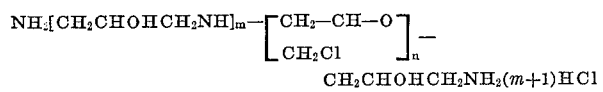

$CH_2CHOHCH_2NH_2(m+1)HCl$ wherein $m$ and $n$ are integers; adjusting the hydrogen ion concentration of the reaction medium to a $pH \geq 7$ with a compound taken in an amount of 0.25 to 2 equivalents per mole of the epichlorohydrin feed; preparing a gel; and allowing said gel to age.

2. A method, according to claim 1, wherein the condensation of epichlorohydrin and ammonia is conducted by introducing aqueous ammonia gradually and continually into stirred epichlorohydrin maintained at a temperature of $65\pm5°$ C., the condensation being carried out until said water soluble oligomer is formed.

3. A method, according to claim 1, wherein the hydrogen ion concentration is adjusted with ammonia.

4. A method, according to claim 1, wherein the hydrogen ion concentration is adjusted with aqueous ammonia.

5. A method, according to claim 1, wherein the hydrogen ion concentration is adjusted with aqueous caustic alkalis.

6. A method, according to claim 5, wherein the hydrogen ion concentration is adjusted with aqueous sodium hydroxide.

7. A method, according to claim 1, wherein the hydrogen ion concentration is adjusted with aqueous solution of alkaline metal salts of a weak acid.

8. A method, according to claim 7, wherein the hydrogen ion concentration is adjusted with an aqueous solution of sodium carbonate.

9. A method, according to claim 1, wherein the hydrogen ion concentration is adjusted with aliphatic diamines of the general formula $NH_2(CH_2)_nNH_2$ in which $n$ is an integer of 2 to 10.

10. A method, according to claim 1, wherein the hydrogen ion concentration is adjusted with aliphatic polyamines of the general formula $NH_2(C_2H_4NH)_nC_2H_4NH_2$ in which $n$ is an integer of 1 to 200.

11. A method, according to claim 1, wherein the hydrogen ion concentration is adjusted with diaminoisopropanol.

12. A method, according to claim 1, wherein the hydrogen ion concentration is adjusted with phenylene diamines.

13. A method, according to claim 1, wherein said gel preparation is carried out by the pearl polycondensation technique in a medium of inert hydrocarbons that are immiscible with said oligomer.

14. A method, according to claim 1, wherein said gel preparation is carried out by the block polymerization technique at a temperature of 70–85° C.

15. A method, according to claim 1, wherein said gel ageing is effected by subjecting said gel to heat treatment at a temperature of 100–140° for a period of 5–12 hours.

16. A method, according to claim 1, wherein said gel ageing is effected by treating said gel with a 2–15% solution of caustic alkalis at a temperature of 80–95° C.

References Cited

UNITED STATES PATENTS

| | | | |
|---|---|---|---|
| 1,977,251 | 10/1934 | Stallman | 260—127 |
| 3,092,617 | 6/1963 | Feldt et al. | 260—2.1 |
| 3,132,112 | 4/1964 | Bartolomeo | 260—2.1 |
| 3,137,659 | 6/1964 | Kekish | 260—2.1 |
| 3,340,208 | 9/1967 | Anderson et al. | 260—2.1 |

FOREIGN PATENTS 57,199 8/1967 Germany.

WILLIAM H. SHORT, Primary Examiner

M. GOLDSTEIN, Assistant Examiner

U.S. Cl. X.R.

260—2